(12) United States Patent
Sato

(10) Patent No.: US 7,373,649 B2
(45) Date of Patent: May 13, 2008

(54) DISK CARTRIDGE

(75) Inventor: Atsushi Sato, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 485 days.

(21) Appl. No.: 11/062,876

(22) Filed: Feb. 23, 2005

(65) Prior Publication Data

US 2005/0201259 A1    Sep. 15, 2005

(30) Foreign Application Priority Data

Feb. 25, 2004    (JP)    ............................ 2004-050488

(51) Int. Cl.
  *G11B 23/03*    (2006.01)
(52) U.S. Cl. .................................... 720/741
(58) Field of Classification Search ............. None
  See application file for complete search history.

(56) References Cited

U.S. PATENT DOCUMENTS

| | | | |
|---|---|---|---|
| 5,526,337 A | | 6/1996 | Housey et al. |
| 5,715,233 A | * | 2/1998 | Yoshida et al. ............. 720/720 |
| 6,005,755 A | * | 12/1999 | Muse et al. ................. 360/133 |
| 6,700,741 B2 | * | 3/2004 | Inoue et al. ................. 360/133 |
| 6,901,602 B2 | * | 5/2005 | Inoue .......................... 720/742 |
| 7,017,170 B2 | * | 3/2006 | Iwaki et al. ................. 720/741 |
| 7,057,854 B2 | * | 6/2006 | Obata et al. ................. 360/133 |
| 2002/0012316 A1 | * | 1/2002 | Inoue et al. ................. 369/291 |
| 2004/0210921 A1 | * | 10/2004 | Shibagaki et al. .......... 720/741 |

FOREIGN PATENT DOCUMENTS

| | | |
|---|---|---|
| JP | 8-55456 | 2/1996 |
| JP | 3430184 | 5/2003 |

\* cited by examiner

*Primary Examiner*—A. J. Heinz
(74) *Attorney, Agent, or Firm*—Antonelli, Terry, Stout & Kraus, LLP.

(57) ABSTRACT

According to the present invention, there is provided a disk cartridge capable of being made compact although the disc cartridge has double structure, which cartridge is improved in light blocking effect and dustproof property, and is particularly suitable for use as a media disk. In this disk cartridge, a shutter is slidably mounted between an inner case and an outer case, and a joint surfaces of upper and lower halves of the inner case, and joint surfaces of upper and lower halves of the outer case are provided at positions at different heights. Light incidence preventing parts which consist of sets of a plurality of lines of ribbed projections are formed on an inner surface of the upper half and an inner surface of the lower half of the outer case.

21 Claims, 17 Drawing Sheets

DISK CARTRIDGE

BACKGROUND OF THE INVENTION

1. Field of the Invention

The present invention relates to a disk cartridge for accommodating a disk-shaped recording medium, and more particularly, to a disk cartridge having double structure suitable for accommodating a hologram media disk.

2. Description of the Prior Art

In recent years, a hologram media disk comes to the fore, which disk has considerably large information storage capacity as compared with a conventional disk-shaped recording medium such as a CD (compact disk) or a DVD (digital video disk). The hologram media disk also has an advantage of being capable of simplifying a drive system of a recording and reproducing apparatus since it has no need to rotationally drive the disk at a high speed.

In digital hologram recording by using this hologram media disk, information is recorded at an interference point in a thickness direction of a recording layer utilizing interference of a recording beam and a reference beam, and the information recorded at this interference point is read out by the reference beam, unlike the digital recording using the conventional disk-shaped recording media. This method makes it possible to record and reproduce a large amount of information at a high speed, since the method can record and reproduce a large amount of data by one light irradiation.

The recording media used for the digital hologram recording is constructed by sandwiching a hologram material between two disk substrates. Conventionally, this hologram material is composed mainly of inorganic single crystal called as photorefractive crystal such as lithium niobate single crystal, and therefore, has problems of being expensive and difficult to process. However, an organic hologram material including a photo polymerization material as a base, which has been investigated in recent years, can be expected to make dramatic improvement concerning the above described problems. More specifically, as an organic hologram recording material, a material which is made by mixing and diffusing the photo polymerization material serving as a recording material into a polymer matrix serving as a support medium is used, and when producing the recording media, this material is diluted by a solvent and coated on a substrate as a coating material, or this material is worked into a film form and then attached on a base material.

However, the hologram material using a photosensitive copolymer is easily deteriorated by exposure to external light, and therefore, in order to putting a recordable or rewritable hologram media disk into practical use, it is necessary to block the external light by accommodating the hologram media disk in a disk cartridge with light blocking effect.

Conventionally, in order to protect the disk-shaped recording media from contamination and mechanical breakage in a VD (video disk) and a MD (minidisk), for example, an art of accommodating the disk-shaped recording media into the disk cartridge has been known. For example, in the specification of U.S. Pat. No. 5,526,337, there is proposed a method for securing light blocking effect during storage, by accommodating hologram media in the cartridge having light blocking effect, and by opening and closing a drive shaft insertion aperture and a head access aperture by using a shutter when attaching and detaching the hologram media to and from a recording and reproducing apparatus.

Also, JP-A-8-55456, for example, discloses a method for making the cartridge structure double to enhance dustproof property. Alternatively, it is proposed to provide the hologram media by using a cartridge in the same shape as a 5.25 type MO cartridge of ISO.

The applicant of the present invention also has proposed a disk cartridge having double structure, for accommodating disk-shaped recording media, which includes: an inner case having an inner head insertion aperture and an inner spindle insertion aperture; an outer case located outside in a thickness direction of the inner case and having an outer head insertion aperture provided at a position overlaying the inner head insertion aperture and an outer spindle insertion aperture provided at a position overlaying the inner spindle insertion aperture; and a shutter slidably disposed between the inner case and the outer case to open and close these insertion apertures. The disk cartridge has been patented (Japanese Patent No. 3430184).

BRIEF SUMMARY OF THE INVENTION

However, in the case of the method described in U.S. Pat. No. 5,526,337, it is necessary to provide a clearance between the shutter and the cases for sliding the shutter, and there is the possibility that the light is directly incident on the accommodated media through this clearance. Therefore, sufficient light blocking effect and dustproof property have not been obtained.

Although the method of interposing the shutter between the inner case and the outer case by using the cartridge of double structure as disclosed in JP-A-8-55456 surely solves the problems of light blocking effect and dustproof property concerning the portions of the head access aperture and the drive shaft insertion aperture, it does not assume the use in the hologram media. Therefore, the other portions have the problem about the light blocking effect, and thus the method is unsuitable for the cartridge for the hologram media. Further, due to the double structure, the cartridge itself is entirely large as compared with the size of the disk to be accommodated therein.

In the disk cartridge of the double structure described in the specification of Japanese Patent No. 3430184 by the applicant of the present invention, the incident route of the external light to the disk-shaped recording media accommodated in the disk cartridge is long and complicated as compared with the case using the above described disk cartridge of the single structure, and therefore, the disk-shaped recording media is hardly exposed to the external light, and the disk cartridge of the double structure is suitable as a disk cartridge for the hologram media disk.

However, in the case of the disk cartridge of the double structure, there is no means for preventing incidence of the external light between the shutter and the shutter sliding surface of the case, and therefore, the external light cannot be completely prevented from leaking into the inner case. Therefore, it cannot be said that this disk cartridge is sufficient as a disk cartridge for the hologram media disk.

The present invention is made to solve the problems of the above prior arts, and its object is to provide a disk cartridge capable of being made compact regardless of the double structure. Another object of the present invention is to provide a disk cartridge capable of preventing light exposure of the disk-shaped recording media when closing a shutter, particularly, a disk cartridge having light blocking effect and dustproof property preferable for an information recording medium such as a hologram medium which is easily deteriorated by the light.

Therefore, according to a first aspect of the present invention, there is provided a disk cartridge provided including a slidable shutter between an inner case and an outer case, which disk cartridge has double structure in which joint surfaces of an upper half and a lower half of the outer case, and joint surfaces of an upper half and a lower half of the inner case are positioned at different heights. Since the heights of the joint surfaces of the upper half and the lower half of the outer case and the joint surfaces of the upper half and the lower half of the inner case are shifted, a gap space in the cross-section of the cases becomes step-like, and therefore, the structure in which light and dust hardly enter is provided. As a result, light blocking effect and dustproof property are enhanced.

According to a second aspect of the present invention, there is provided a disk cartridge having double structure, which includes a slider for slidably mounting a shutter between an inner case and an outer case, wherein the slider has a pin for positioning the shutter, and the shutter has a hole in which the pin of the slider is inserted, whereby the slider and the shutter are connected by fitting this pin into the hole. An edge portion of the shutter is disposed between the inner case and the outer case, so that the structure enhanced in light blocking effect and dustproof property can be provided. Also, since the shutter is positioned by the pin, it becomes unnecessary to fix the shutter by means of a screw or the like. Further, the slide of the shutter is restrained by the outer case and the inner case, and therefore, the number of components can be reduced. According to this structure, it becomes possible to assemble the disk cartridge easily.

According to a third aspect of the present invention, there is provided a disk cartridge having double structure in which a shutter includes a head insertion aperture opening and closing part, a spindle insertion aperture opening and closing part, and a fix connection part for connecting the head insertion aperture opening and closing part and the spindle insertion aperture opening and closing part, and this fix connection part is disposed between an inner case and an outer case so as not to be exposed to the outside of the cases. Since the shutter fix connection part is not exposed to the outside, it can be prevented that the shutter is removed unexpectedly, deformed, or the shutter is deliberately opened and closed, and therefore, there is no fear that light is applied to an unrecorded hologram medium by mistake.

According to a fourth aspect of the present invention, there is provided a cartridge having double structure, which includes a lock member for locking and releasing a shutter, wherein a pivot portion center of this lock member is provided on an inner case side, and a restraining portion of the lock member is provided in an outer case side. This construction makes it unnecessary to consider that the shutter is interfered by the difference in engaging level of the inner case and the outer case when the shutter slides, and therefore, free design is made possible concerning the shape of the slider.

According to a fifth aspect of the present invention, there is provided a disk cartridge having double structure in which a pin for positioning an inner case is provided in an outer case, and an insertion aperture of the positioning pin is provided in the inner case. By providing the positioning pin and the aperture in the inner case and the outer case respectively, positioning of the inner case and the outer case is not only facilitated, but also the number of components can be reduced by substituting the pin and aperture for a member for fixing an upper half and a lower half of the inner case, and therefore, it becomes possible to facilitate assembly.

According to a sixth aspect of the present invention, there is provided a disk cartridge which is constructed so that the maximum lateral width portions of disk housing parts of an inner case and an outer case become thin-walled portions. The thin-walled portion is provided so that the maximum lateral width portion of the inner case is substantially the same as an outer shape of a disk to be accommodated, and a portion of the outer case corresponding to this portion is a thin-walled portion, whereby it is not necessary to make the outer shape large regardless of the double structure, and therefore, a disk cartridge having double structure of the same size as 5.25 type optical magnetic disk of the ISO standard, for example, can be provided.

A seventh aspect of the present invention is directed to a disk cartridge in which a shutter is provided in the vicinity of a center in a cartridge width direction and the shutter can be opened and closed only in one of left and right directions. Two pairs of shutter opening and closing arms and error insertion preventing arm are provided on a drive (driving system), and a recessed shape for releasing the arms and a recessed shape which works as a reverse insertion preventing stopper are provided in a combination state, in the disk cartridge. According to this construction, even if a disk cartridge of a single-sided specification for accommodating a single-sided recording disk and a disk cartridge of a both-side specification for accommodating a both side recording disk exist in a mixed state, the disk cartridge of the single-sided specification can be inserted only in a normal direction, and the disk cartridge of the both-side specification can be inserted in both normal and reverse directions. According to the seventh aspect of the present invention, the disk cartridge having such a shutter opening and closing structure and the apparatus for recording and reproducing it are provided.

According to the first to seventh aspects of the present invention, a disk cartridge of the same size as a normal cartridge, excellent in light blocking effect and dustproof property with a small number of components can be provided while the disk cartridge has dual structure. The disk cartridge according to the present invention is especially preferable for the information recording media such as a hologram medium which need highly light blocking effect.

According to an eighth aspect of the present invention, there is provided a disk cartridge having double structure, which includes: an inner case having an inner head insertion aperture and an inner spindle insertion aperture for accommodating a disk-shaped recording medium therein; an outer case located outside in a thickness direction of the inner case, the outer case having an outer head insertion aperture provided in a position overlapping with the inner head insertion aperture, and an outer spindle insertion aperture provided in a position overlapping with the inner spindle insertion aperture; and a shutter slidably disposed between the inner case and the outer case for opening and closing the inner head insertion aperture and the outer head insertion aperture, and the inner spindle insertion aperture and the outer spindle insertion aperture. This disk cartridge includes light incidence preventing parts for preventing external light from leaking into the inner case from a gap between the shutter and the shutter sliding surface, which light incidence preventing parts are provided on the shutter sliding surface on the outer side of the inner case and the shutter sliding surface of inner side of the outer case.

The external light passing between the shutter and the shutter sliding surface so as to come into the inner case can be blocked by providing the light incidence preventing parts for preventing the leakage of the external light into the inner case on the shutter sliding surface of the inner case and/or the shutter sliding surface of the outer case constructing the disk cartridge having the double structure, and therefore, deterioration of the hologram media disk due to exposure to the external light can be prevented.

According to the present invention, the light incidence preventing part may be provided only in a peripheral portion of each insertion port on the shutter sliding surfaces in the disk cartridge of the above described construction.

The leakage of the external light into the inner case when the shutter is closed occurs in a portion where the shutter and the shutter sliding surface overlap with each other, namely, in a gap between the outer edge portion of the shutter and the peripheral portion of each of the insertion port. Accordingly, the exposure preventing effect for the disk-shaped recording media, which is practically sufficient, can be obtained by providing the light incidence preventing part only in the peripheral portion of the necessary insertion port.

According to the present invention, in the disk cartridge of the above described construction, a rib-shaped or crimp-shaped (or wave-shaped) projection may be formed on the shutter sliding surface as a light incidence preventing part.

By forming the rib-shaped or crimp-shaped projection on the shutter sliding surface, the external light incident from a gap between the shutter and the shutter sliding surface can be reflected and/or diffracted by a wall surface of the projection, and therefore, the external light toward the inside of the inner case can be blocked, and leakage of the external light into the inner case can be prevented. Further, since a contact area of the shutter and the shutter sliding surface is small, the operation of the shutter can be light.

Further, according to the present invention, in the disk cartridge of the above described construction, a combination of the rib-shaped and crimp-shaped projections may be formed on the shutter sliding surface as a light incidence preventing part.

By combining the rib-shaped projection and the crimp-shaped projection like this, the rib-shaped projections and the crimp-shaped projections can be properly arranged in accordance with a state of the shutter sliding surface, so that easiness of forming the inner case and/or the outer case, and slidability of the shutter are improved.

Further, according to the present invention, in the disk cartridge of the above described construction, a hair implant may be applied onto the shutter sliding surface as a light incidence preventing part.

According to such construction, the external light incident from a gap between the shutter and the shutter sliding surface can be reflected and/or diffracted by the hair implant, and therefore, the same operational effects as in the case when the rib-shaped or crimp-shaped recessions and projections are formed on the shutter sliding surface can be obtained.

Further, according to the present invention, in the disk cartridge of the above described construction, a combination of the rib-shaped or crimp-shaped projection and the hair implant may be formed on the shutter sliding surface as a light incidence preventing part.

According to the above construction, the rib-shaped projection or the crimp-shaped projection and the implanted hair can be suitably arranged in accordance with a state of the shutter sliding surface, and therefore, the forming easiness of the inner case and/or the outer case, and the slidability of the shutter can be improved.

Further, according to the present invention, in the disk cartridge of the above described construction, an antireflection sheet may be stuck on the shutter sliding surface as a light incidence preventing part.

By sticking the antireflection sheet on the shutter sliding surface, multiple reflections of the external light incident from a gap between the shutter and the shutter sliding surface can be prevented, so that leakage of the external light into the inner case is prevented. Further, since a member excellent in lubricity is disposed between the shutter and the shutter sliding surface, the operation of the shutter becomes light.

Further, according to the present invention, in the disk cartridge of the above described construction, painting of dark color such as black may be applied to the shutter sliding surface as a light incidence preventing part.

The external light incident from a gap between the shutter and the shutter sliding surface is absorbed by the painted surface of dark color by applying the painting of dark color onto the shutter sliding surface, and its multiple reflections are prevented. Therefore, the external light toward the inside of the inner case can be blocked, namely, the external light toward the inside of the inner case can be prevented.

Further, according to the present invention, in the disk cartridge of the above described construction, painting of dark color such as black may be applied onto a surface of the shutter opposed to the inner case and/or a surface of the shutter oppose to the outer case as a light incidence preventing part.

According to such construction, the external light incident from a gap between the shutter and the shutter sliding surface is absorbed by the painted surface of dark color, and its multiple reflections are prevented, and therefore, the external light toward the inside of the inner case can be blocked, namely, leakage of the external light into the inner case can be prevented.

Since the disk cartridge according to the eighth aspect of the present invention includes the light incidence preventing part on the shutter sliding surface of the inner case and/or the outer case, the external light which passes between the shutter and the shutter sliding surface to come into the inner case can be blocked, and deterioration of the hologram media disk due to exposure to the external light can be prevented.

Embodiments of the present invention will be explained below based on the drawings.

The other objects, characteristics and advantages of the present invention will become apparent from the description of the embodiments of the present invention relating to the attached drawings.

DETAILED DESCRIPTION OF THE INVENTION (1. Construction of A Double Structure Cartridge)

Figure 1:
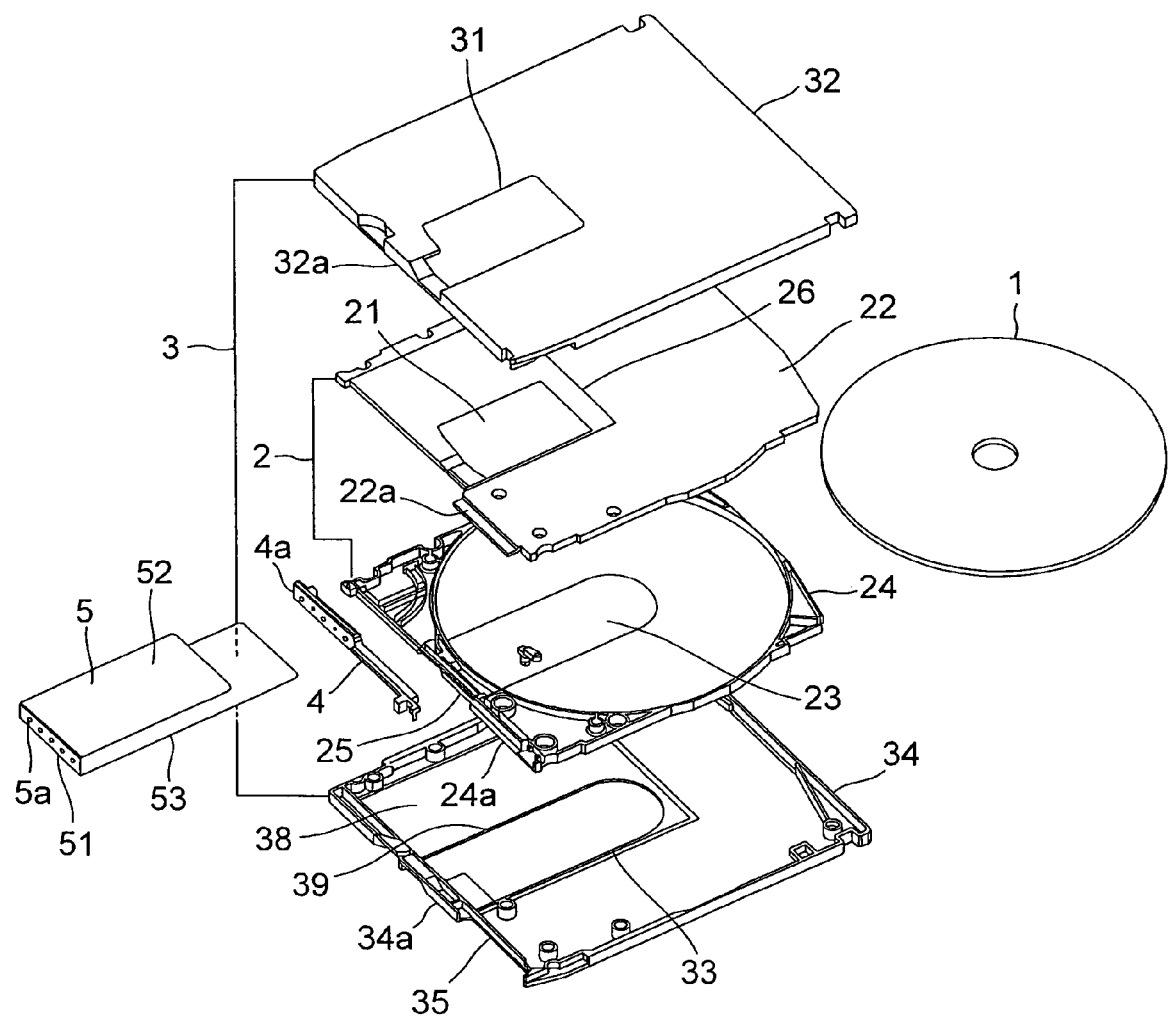
FIG. 1 is an exploded perspective view of a disk cartridge according to an embodiment of the present invention.

As shown in FIG. 1, a disk cartridge according to an embodiment of the present invention is constructed mainly by a disk-shaped recording medium 1, an inner case 2, an outer case 3, a slider 4, a shutter 5 and a lock member 60.

Any known disk-shaped recording medium can be accommodated as the disk-shaped recording medium 1, however, in this embodiment, a hologram media disk constructed by sandwiching hologram between two disk substrates is accommodated. The construction of the hologram media disk is known, and is not the gist of the present invention, and therefore, the explanation will be omitted.

The inner case 2 consists of an upper half 22 and a lower half 24, and provides double case structure with the outer case 3 consisting of an upper half 32 and a lower half 34 disposed outside the inner case 2 in the thickness direction.

As shown in FIG. 1, an outer head insertion aperture 31 is formed substantially in a center of the upper half 32 on a side of the shutter 5, and an outer spindle insertion aperture (or an outer lower head insertion aperture) 33 is formed substantially in a center of the lower half 34 on the side of the shutter 5.

A shutter sliding surface 38 having a size including the outer spindle insertion aperture 33 is formed so as to be lowered by one step on an inner surface of the lower half 34, and a shutter sliding surface 36 (not shown) is formed similarly on an inner surface of the upper half 32. Shutter sliding surfaces 26 and 27 are also formed on the upper and lower halves 22 and 24 so as to substantially correspond to the outlines of the shutter sliding surfaces 36 and 38. By the shutter sliding surfaces 36 and 38 and the shutter sliding surfaces 26 and 27, clearances for sliding the head insertion aperture opening and closing part 52 and the spindle insertion aperture opening and closing part 53 of the shutter 5 are formed between the upper half 22 and the upper half 32, and between the lower half 24 and the lower half 34, respectively, so that a sliding area of the shutter 5 is restrained.

Figure 2:
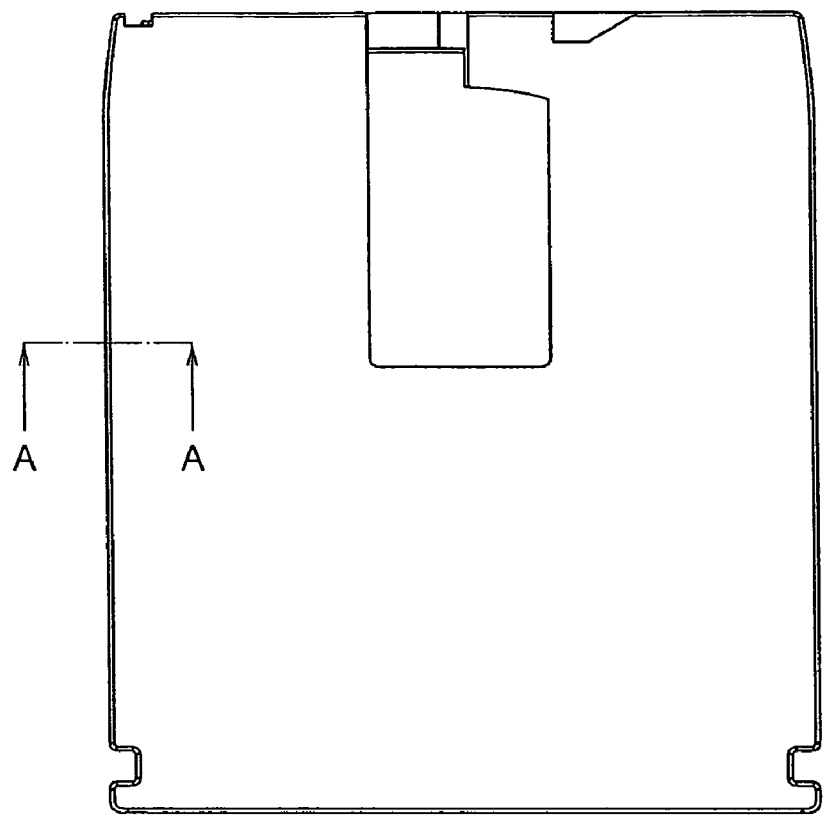
FIG. 2 is a front view and a partially enlarged sectional view showing the difference in jointed level of an inner case and an outer case according to the embodiment of the present invention.
Figure 2:
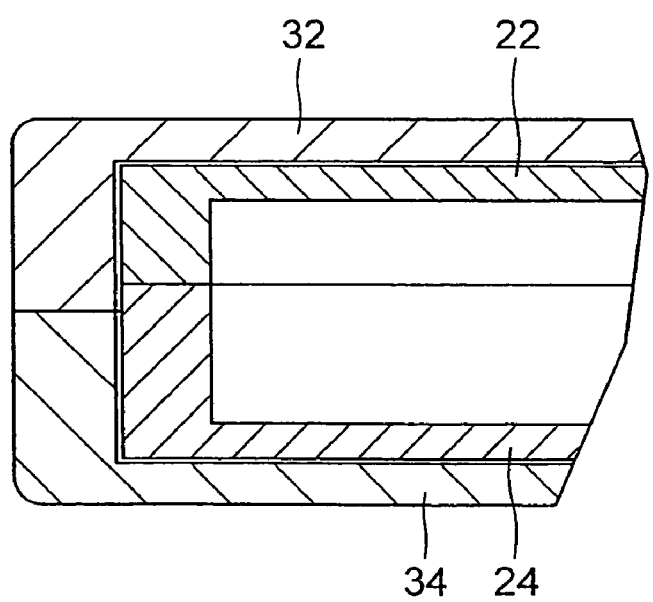

The upper half 32 and the lower half 34 are formed to have the same thickness, but the upper half 22 and the lower half 24 are formed to have a different thickness ratio. As a result, the difference in level is provided between a joint position of the inner cases and a joint position of the outer cases as shown in FIG. 2, and thereby, light block effect and dustproof property are enhanced.

Figure 3:
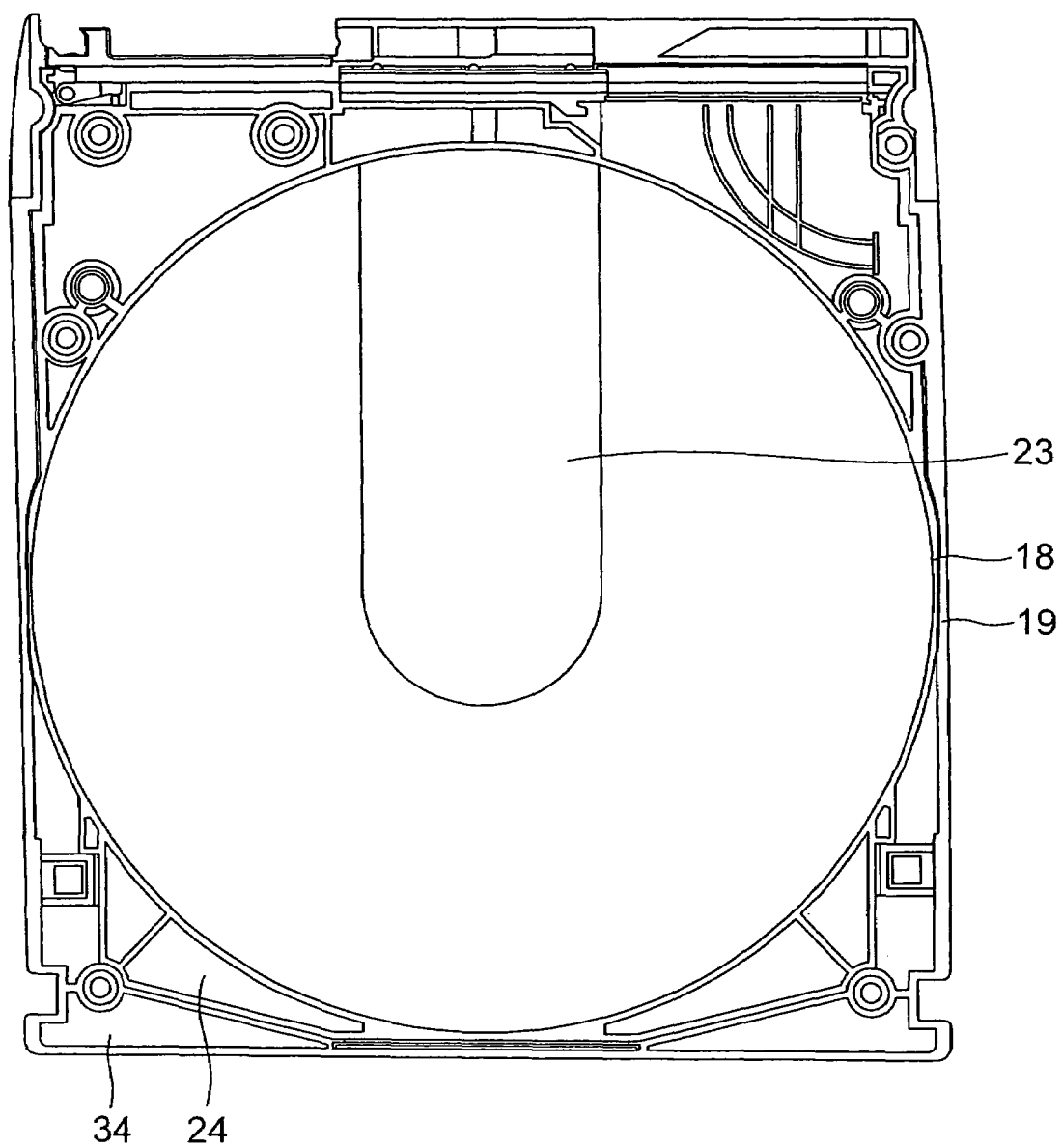
FIG. 3 is a view showing thin-walled portions of an inner case and an outer case along a disk outer peripheral shape, according to the embodiment of the present invention.

As shown in FIG. 3, a curved surface part 18 along an outer peripheral shape of the disk recording medium 1 is provided in a part of the lower half 24 of the inner case 2, and a thin-walled part 19 is provided in a spot corresponding to the curved surface part 18, of the lower half 34 of the outer case 3. This construction makes it possible to accommodate the disk recording medium having a larger diameter than that of the conventional disk cartridge having the same width dimension.

Figure 36:
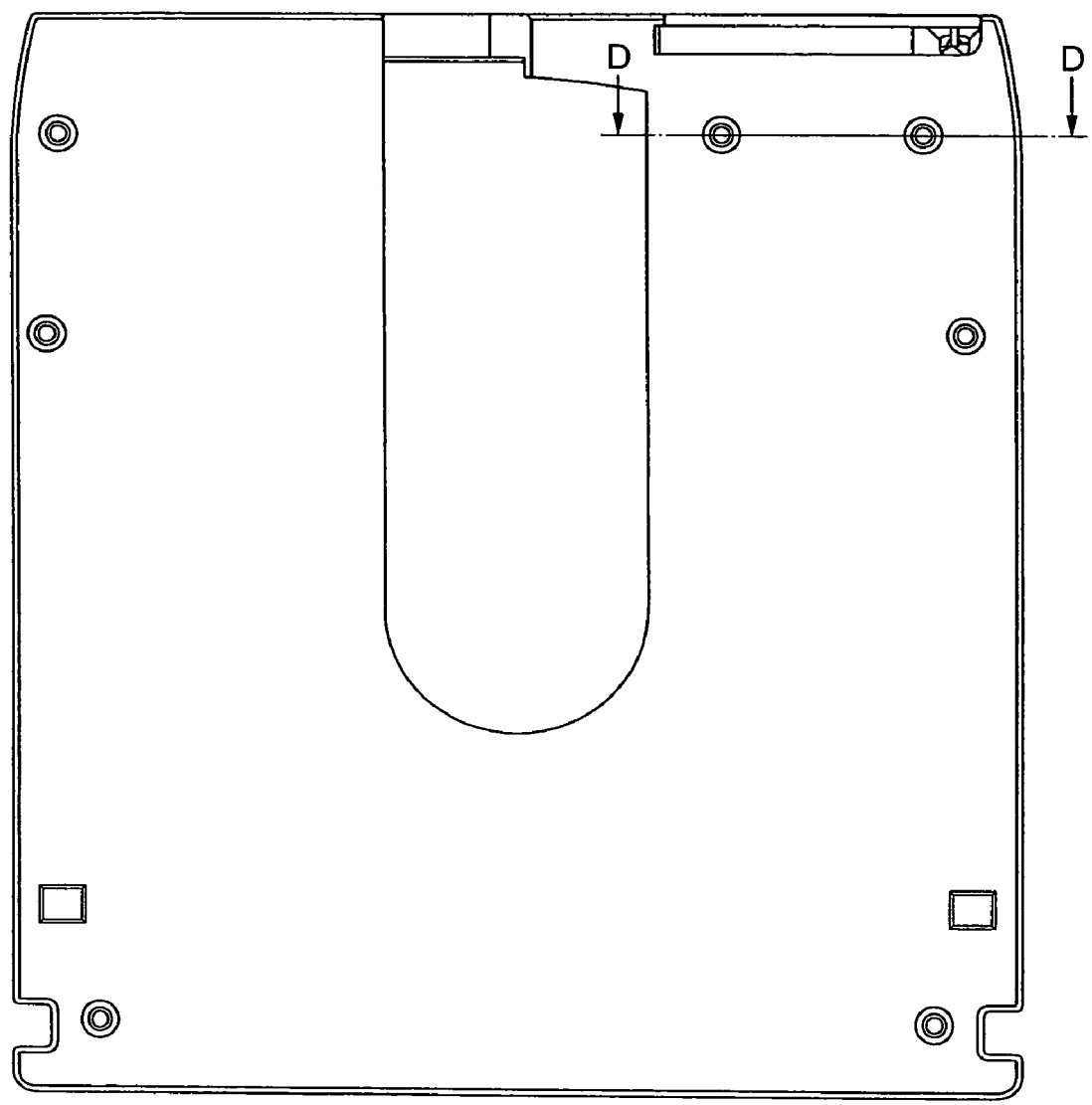
FIG. 36 is a front view of the disk cartridge according to the embodiment of the present invention.
Figure 37:
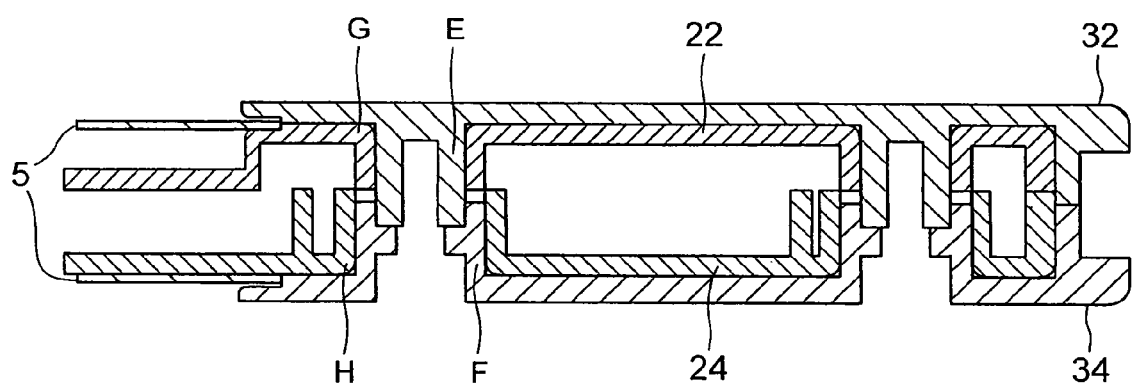
FIG. 37 is an enlarged sectional view taken along the line D-D in FIG. 36.

As shown in FIGS. 36 and 37, projected portions E and F for fastening the upper half 32 and the lower half 34 are provided on the inside of the outer case 3, and recessed portions G and H are provided in positions of the upper half 22 and the lower half 24 of the inner case 2, corresponding to the projected portions E and F, whereby it becomes unnecessary to fasten the upper half 22 and the lower half 24 of the inner case 2, and reduction in the number of components becomes possible. In addition, positioning of the outer cartridge 2 can be easily made.

(2. Mounting of A Slider And A Shutter)

As shown in FIG. 1, the shutter 5 is constructed by the head insertion aperture opening and closing part 52, the spindle insertion aperture opening and closing part 53, and the fixing part 51. The shutter 5 is combined with the slider 4, and slides along a slider rail 22a provided in the upper half 22 and a slider rail 24a provided in the lower half 24.

The shutter 5 is mounted so as to be restrained in position in the lateral direction of a front view shown in FIG. 2 by a positioning projected part 4a provided in the slider 4 and a hole part 5a into which the projected part 4a is fitted, and which hole part 5a is provided in the fixing part 51 of the shutter 5. The shutter 5 is restrained in its displacement in an upward direction in the front view shown in FIG. 2 by the outer case 3.

Figure 4:
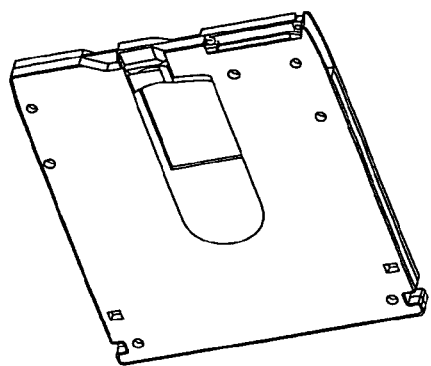
FIG. 4 is a view showing a fully opened state of a shutter of the disk cartridge according to the embodiment of the present invention.

The fixing part 51 of the shutter 5 is covered with bridges 32a and 34a which form end portions of the outer head insertion aperture 31 of the upper half 32 and the outer spindle insertion aperture 33 of the lower half 34, and therefore, the fixing part 51 hardly has an exposed portion. Further, when the shutter 5 is in an opened state (FIG. 4), the fixing part 51 slides between the inner case 2 and the outer case 3, so that the entire shutter 5 is not exposed to a surface. Such a structure is advantageous for preventing the shutter from opening unexpectedly.

(3. Lock Mechanism)

Figure 5:
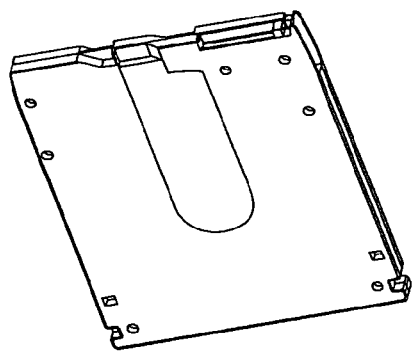
FIG. 5 is a view showing a closed state of the shutter of the disk cartridge according to the embodiment of the present invention.
Figure 6:
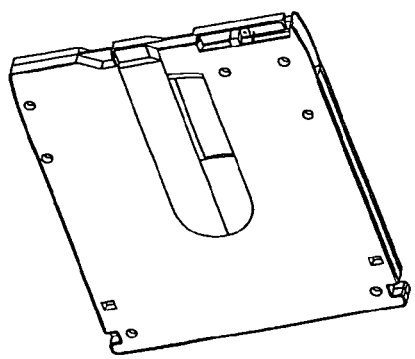
FIG. 6 is a view showing a half-opened state of the shutter of the disc cartridge according to the embodiment of the present invention.
Figure 7:
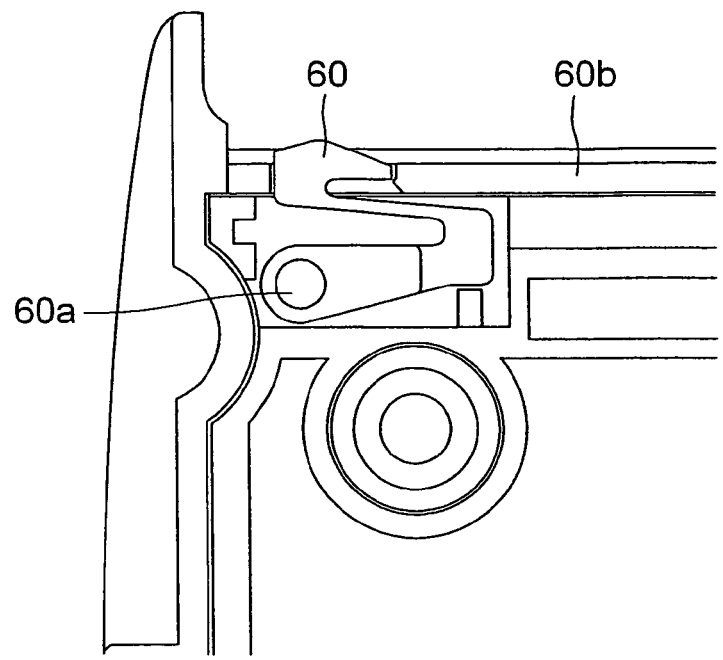
FIG. 7 is an enlarged view of a lock mechanism part of the disk cartridge according to the embodiment of the present invention.
Figure 8:
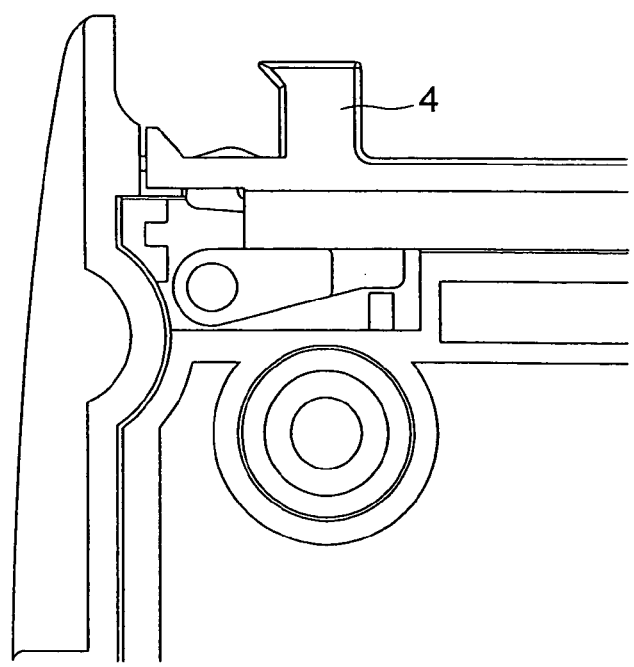
FIG. 8 is an enlarged view of the lock mechanism part of the disk cartridge according to the embodiment of the present invention.

As shown in FIGS. 7 and 8, the lock member 60 which is designed to be engaged with the slider 4 to lock (or lock and release) the shutter 5 in a position of a closed state (FIG. 5) is provided. A pivot portion center 60a of the lock member 60 is provided in the inner case 2, and a restraining portion 60b of the lock member 60 is provided in the outer case 3, whereby a fitting gap of the inner case 2 and the outer case 3 can be prevented from existing on a surface on which the slider 4 slides to open and close the shutter 5. When the lock is released and the shutter 5 slides, it is not necessary to consider interference with the slider 4 by the fitting gap of the inner case 2 and the outer case 3, and therefore, it is possible to freely design the shape of the slider 4.

(4. Error Insertion Preventing Mechanism)

Figure 9:
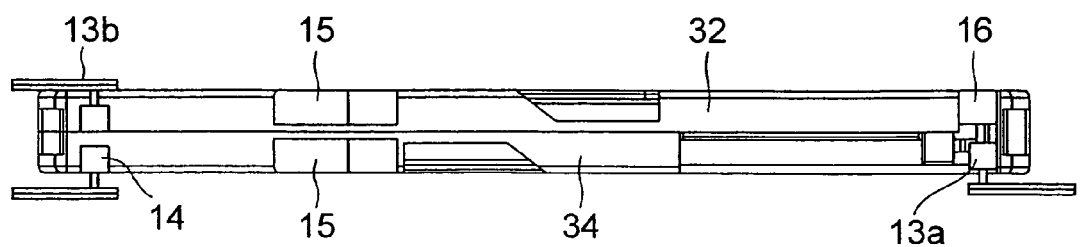
FIG. 9 is a view seen from the slider side, which shows a shutter closed state at the time of insertion of the disk cartridge having an incorrect insertion preventing function according to the embodiment of the present invention.
Figure 10:
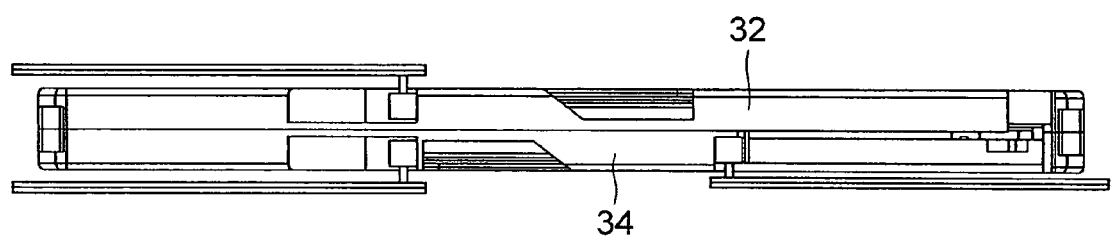
FIG. 10 is a view seen from the slider side, which shows a shutter opened state at the time of insertion of the disk cartridge having the incorrect insertion preventing function according to the embodiment of the present invention.
Figure 11:
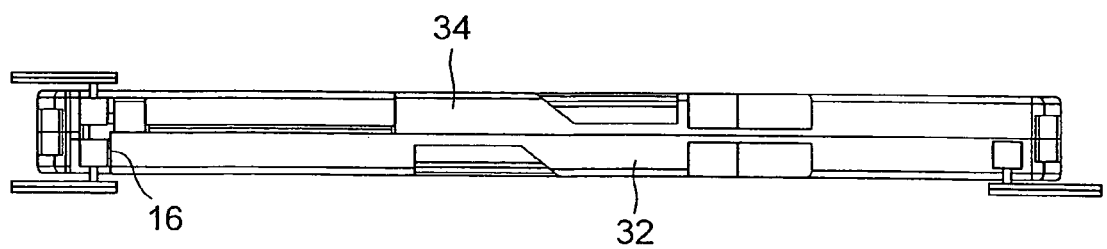
FIG. 11 is a view seen from the slider side, which shows a state when the disk cartridge having the incorrect insertion preventing function according to the embodiment of the present invention is inserted downside up.

A disk drive (not shown) for recording and reproducing the disk cartridge according to the embodiment of the present invention is provided with two shutter opening and closing arms 13, and an error insertion (incorrect insertion) preventing arm 14 (FIGS. 9 to 11). In order to open and close the shutter 5, one of the shutter opening and closing arms 13 is disposed at a location where it abuts on the slider 4 incorporated in the disk cartridge, and an arm release recessed shape 15 in which the other shutter opening and closing arm 13 (which has not performed a shutter opening operation when the shutter 5 is fully opened), and the error insertion preventing arm 14 enter is provided in the disk cartridge. The disk cartridge is provided with a reverse direction insertion preventing stopper 16 in a recessed shape in which the error insertion preventing arm 14 is caught when the disk cartridge of the single-sided specification is inserted downside up.

Here, the shutter opening and closing arm 13 located on the lower right side of the disk cartridge in FIG. 9 is set as an opening and closing arm 13a, and the shutter opening and closing arm 13 located at the upper left side is set as an opening and closing arm 13b, for convenience.

FIG. 9 shows a shutter closed state of the disk cartridge of the single-sided specification. When the disk cartridge of the single-sided specification is correctly inserted, the opening and closing arm 13a operates to open the shutter 5 as shown in FIG. 10, and meanwhile, the opening and closing arm 13b and the reverse insertion preventing arm 14 slide on the surface of the disk cartridge on the side of the shutter 5, and get into the arm release recessed shape 15 when the shutter 5 comes to the vicinity of the fully opened position. When the disk cartridge is inserted downside up, the error insertion preventing arm 14 is caught by the error insertion preventing stopper 16 as shown in FIG. 11, and the slider 4 cannot be opened.

In the case of the disk cartridge of a double-sided specification, when it is inserted in one direction, the opening and closing arm 13a operates to open the shutter 5 as in the case where the disk cartridge of a single-sided specification is inserted, and at the same time, the opening and closing arm 13b and the error insertion preventing arm 14 slide on the surface of the disk cartridge on the slider side, and get into the arm release recessed shape 15 when the shutter 5 is substantially fully opened, whereby the shutter 5 is fully opened. When the disk cartridge is inserted in the opposite direction, the opening and closing arm 13b operates to open the shutter 5, and at the same time, the opening and closing arm 13a and the error insertion preventing arm 14 slide on the surface of the disk cartridge on the side of the slider, and get into the arm release recessed shape 15 when the shutter 5 is substantially fully opened, whereby the shutter 5 is fully opened.

(5. Light Incidence Prevention Mechanism)

Figure 12:
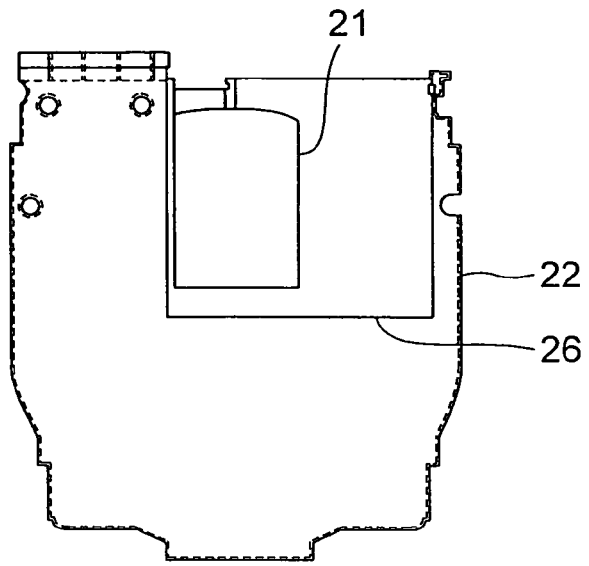
FIG. 12 is a view of an outer surface of an upper half of the inner case according to the embodiment of the present invention.
Figure 13:
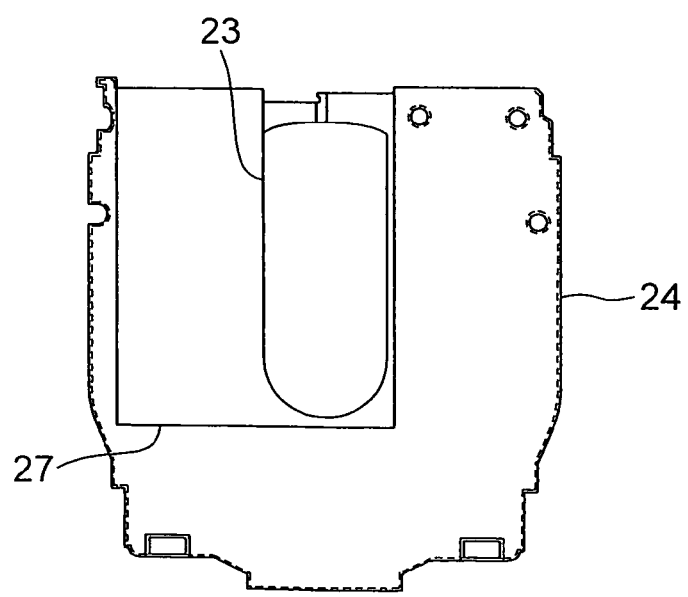
FIG. 13 is a view of an outer surface of a lower half of the inner case according to the embodiment of the present invention.

As shown in FIG. 1, the inner head insertion aperture 21 is formed in the upper half 22 of the inner case 2 and the inner spindle insertion aperture 23 is formed in the lower half 24. A slider setting part 25 for slidably mounting the slider 4 is provided on a side at one end of the inner case 2. As shown in detail in FIG. 12, the shutter sliding surface 26 of a shallow recessed shape is formed over an area where the shutter 5 is movable including an area of the inner head insertion aperture 21, on an outer surface of the upper half 22. The shutter sliding surface 27 of a shallow recessed shape is also formed over an area, where the shutter 5 is movable, including the area of the inner spindle insertion aperture 23, on an outer surface of the lower half 24 (FIG. 13).

Figure 14:
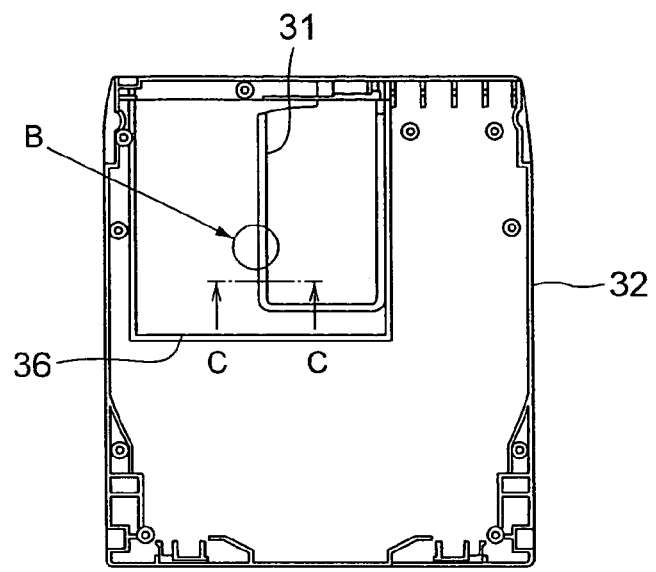
FIG. 14 is a view of an inner surface of an upper half of the outer case according to the embodiment of the present invention.
Figure 15:
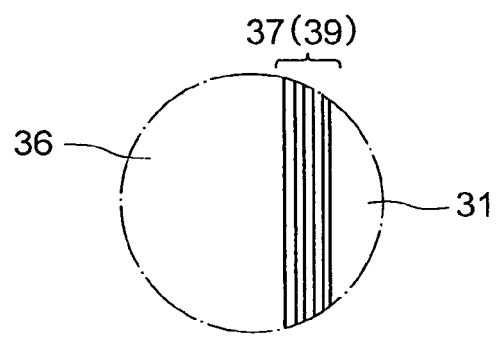
FIG. 15 is an enlarged plane view of the portion B in FIG. 14.
Figure 16:
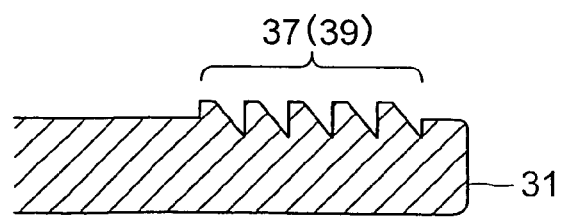
FIG. 16 is an enlarged sectional view taken along the line C-C in FIG. 14.
Figure 17:
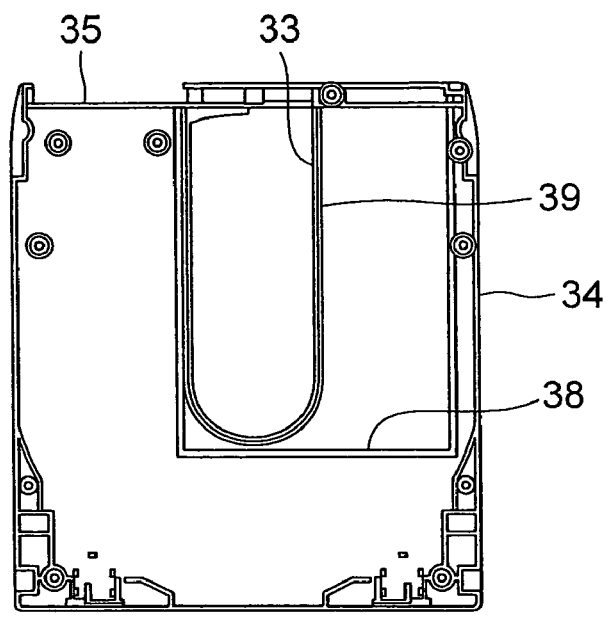
FIG. 17 is a view of the inner surface of a lower half of the outer case according to the embodiment of the present invention.

The outer head insertion aperture 31 is formed in the upper half 32 of the outer case 3, and the outer spindle insertion aperture 33 is formed in the lower half 34. A slider operation part 35 for receiving a shutter operating member of the recording and reproducing apparatus to operate the slider 4 to open and close it is provided on a side at one end of the outer case 3. As shown in detail in FIG. 14, the shutter sliding surface 36 of a shallow recessed shape is formed over the area, where the shutter 5 is movable, including the area of the outer head insertion aperture 31, on the inner surface of the upper half 32. As shown in FIGS. 14 to 16, a light incidence preventing part 37 consisting of a set of plurality of lines (or streaks) (five lines in the example in FIGS. 15 and 16, and thee lines in the example in FIG. 18) of rib-shaped projections is formed on the peripheral portion of the outer head insertion aperture 31 on the shutter sliding surface 36 to be parallel to the periphery of the outer head insertion aperture 31. As shown in detail in FIG. 17, the shutter sliding surface 38 of the shallow recessed shape is formed over the area, where the shutter 5 is movable, including the area of the outer spindle insertion aperture 33, on the inner surface of the lower half 34, and a light incidence preventing part 39 similar to the light incidence preventing part 37 formed on the inner surface of the upper half 32 is formed on the peripheral portion of the outer spindle insertion aperture 33 in the shutter sliding surface 38.

The insertion apertures 21, 23, 31 and 33 are formed in positions where those overlap with each other when the halves 22, 24, 32 and 34 are assembled as shown in FIG. 1.

The slider 4 is provided so as to smoothly open and close the shutter 5, and can be formed from a material such as polyacetal resin excellent in lubriciy, for example.

Figure 18:
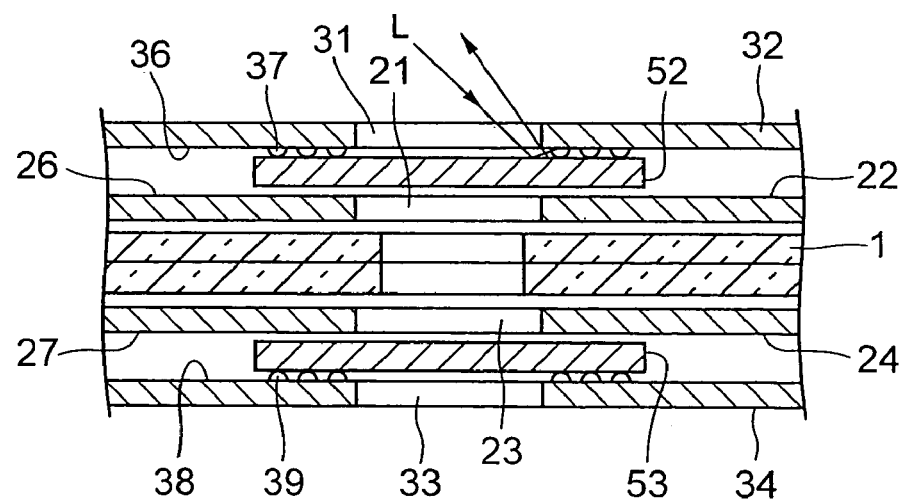
FIG. 18 is an enlarged sectional view of a substantial part of the disk cartridge according to the embodiment of the present invention.

The shutter 5 is formed by the fixing part 51, the head insertion aperture opening and closing part 52 and the spindle insertion aperture opening and closing part 53 so that its side shape has a U-shape, and is disposed between the shutter sliding surfaces 26 and 27 of the inner case 2, and the shutter sliding surfaces 36 and 38 of the outer case 3 as shown in FIG. 18.

In the disk cartridge of this embodiment, the light incidence preventing parts 37 and 39 each consisting of a set of rib-shaped projections are provided on the shutter sliding surfaces 36 and 38 of the outer case 3 as shown in FIG. 18, and therefore, the external light L incident between the shutter 5 and the shutter sliding surfaces 36 and 38 is reflected by wall surfaces of the light incidence preventing parts 37 and 39, and the external light L which comes into the inner case 2 from between the shutter 5 and the shutter sliding surfaces 36 and 38 is blocked, whereby deterioration of the hologram media disk 1 by exposure to the external light can be prevented. Since the contact area of the shutter 5 and the shutter sliding surfaces 36 and 38 is small, the operation of the shutter 5 can be made light.

Other embodiments of the light incidence preventing mechanism according to the present invention will be cited.

Figure 19:
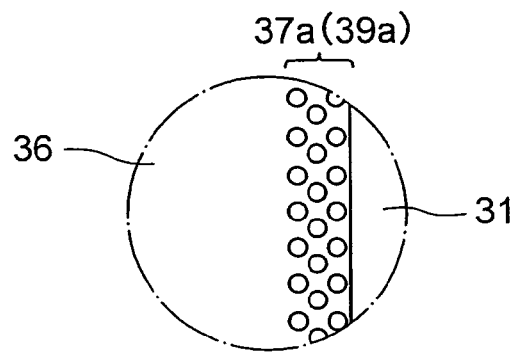
FIG. 19 is an enlarged plane view of a substantial part of a disk cartridge according to another embodiment of the present invention.

(1) Instead of the light incidence preventing parts 37 and 39 each consisting of a set of rib-shaped projections, light incidence preventing parts 37*a* and 39*a* each consisting of a set of crimp-shaped projections can be formed as shown in FIG. 19. In this case, the external light L incident between the shutter 5 and the shutter sliding surfaces 36 and 38 is also reflected and diffracted by wall surfaces of the light incidence preventing parts 37*a* and 39*a,* and therefore, the external light L which passes between the shutter 5 and the shutter sliding surfaces 36 and 38 so as to come into the inner case 2 can be blocked.

Figure 20:
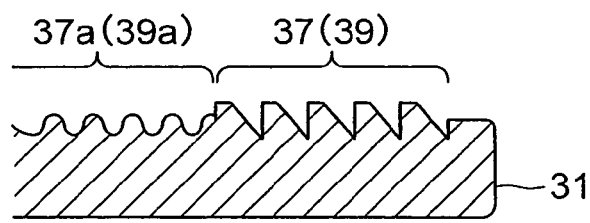
FIG. 20 is an enlarged sectional view of a substantial part of a disk cartridge according to still another embodiment of the present invention.

(2) Instead of the construction consisting of a single kind of projection as described above, the light incidence preventing mechanism can be formed by combining the light incidence preventing parts 37 and 39 each consisting of a set of the rib-shaped projections and light incidence preventing parts 37*a* and 39*a* each consisting of a set of crimp-shaped projections as shown in FIG. 20. According to this construction, the rib-shaped projections and the crimp-shaped projections can be suitably disposed in accordance with the states of the shutter sliding surfaces 36 and 38, and therefore, easiness of forming the inner case 2 and/or the outer case 3 and slidability of the shutter 5 can be enhanced.

Figure 21:
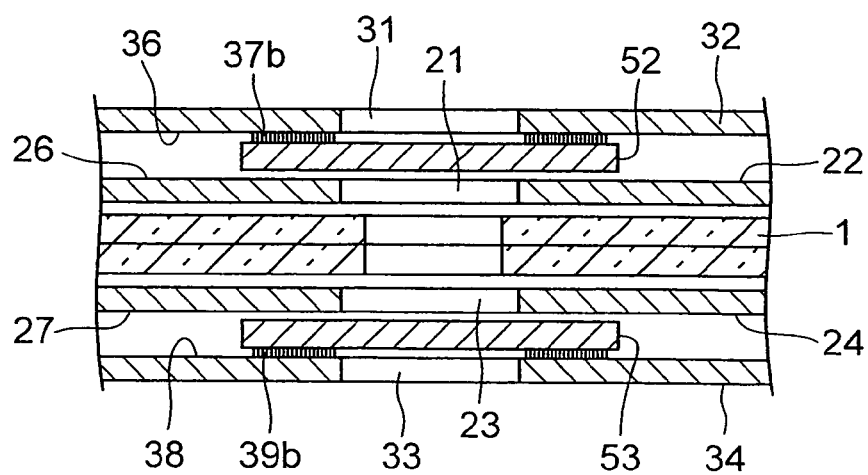
FIG. 21 is an enlarged sectional view of a substantial part of a disk cartridge according to still another embodiment of the present invention.

(3) Instead of the construction consisting of a set of projections as described above, light incidence preventing parts 37*b* and 39*b* consisting of implanted hair can be formed as shown in FIG. 21. In this case, the external light L incident between the shutter 5 and the shutter sliding surfaces 36 and 38 is reflected and diffracted by the implanted hair 37*b* and 39*b,* and therefore, the external light L which passes between the shutter 5 and the shutter sliding surfaces 36 and 38 so as to come into the inner case 2 can be blocked.

Figure 22:
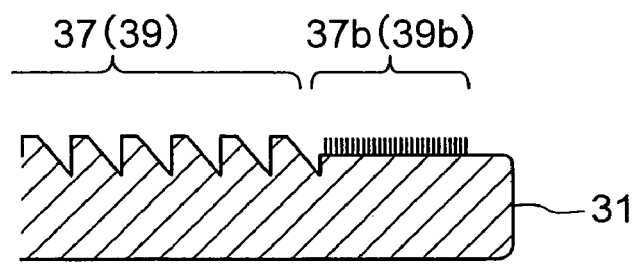
FIG. 22 is an enlarged sectional view of a substantial part of a disk cartridge according to still another embodiment of the present invention.
Figure 23:
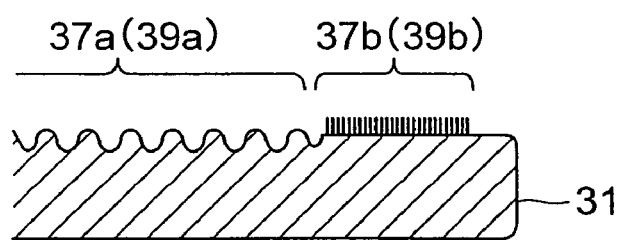
FIG. 23 is an enlarged sectional view of a substantial part of a disk cartridge according to still another embodiment of the present invention.
Figure 24:
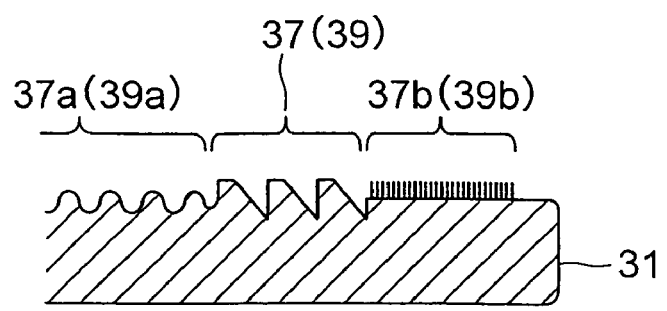
FIG. 24 is an enlarged sectional view of a substantial part of a disk cartridge according to still another embodiment of the present invention.

(4) The light incidence preventing parts 37 and 39 each consisting of a set of rib-shaped projections and the light incidence preventing parts 37*b* and 39*b* each consisting of implanted hair can be combined as shown in FIG. 22, and the light incidence preventing parts 37*a* and 39*a* each consisting of a set of crimp-shaped projections and the light incidence preventing parts 37*b* and 39*b* each consisting of the implanted hair can be combined as shown in FIG. 23. Further, the light incidence preventing parts 37 and 39 each consisting of a set of rib-shaped projections, the light incidence preventing parts 37*a* and 39*a* each consisting of a set of crimp-shaped projections, and the light incidence preventing parts 37*b* and 39*b* each consisting of the implanted hair can be combined as shown in FIG. 24. According to this construction, the rib-shaped projections, the crimp-shaped projections and implanted hair can be disposed more properly in accordance with the states of the shutter sliding surfaces 36 and 38, and therefore, the forming easiness of the inner case 2 and/or the outer case 3 and the slidability of the shutter 5 can be further enhanced.

Figure 25:
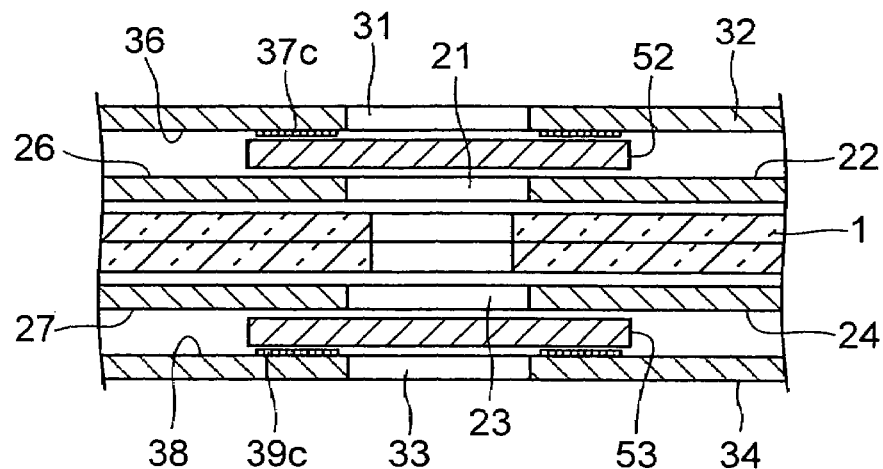
FIG. 25 is an enlarged sectional view of a substantial part of a disk cartridge according to still another embodiment of the present invention.
Figure 26:
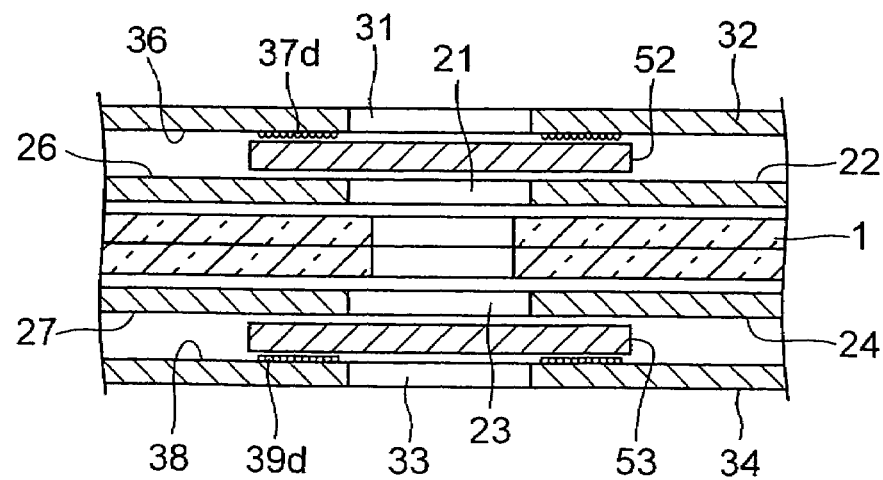
FIG. 26 is an enlarged sectional view of a substantial part of a disk cartridge according to still another embodiment of the present invention.
Figure 27:
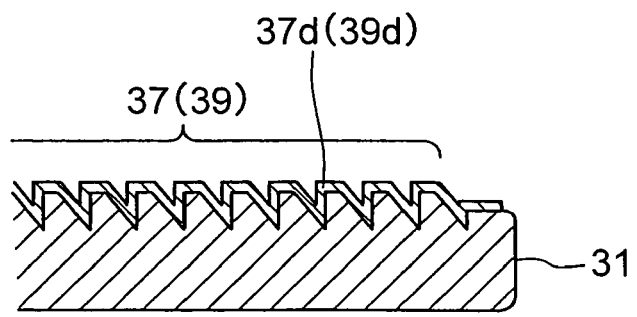
FIG. 27 is an enlarged sectional view of a substantial part of a disk cartridge according to still another embodiment of the present invention.
Figure 28:
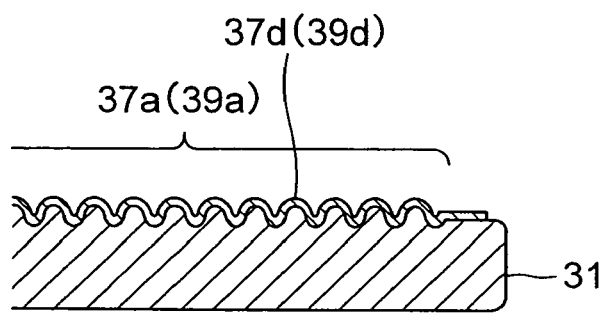
FIG. 28 is an enlarged sectional view of a substantial part of a disk cartridge according to still another embodiment of the present invention.
Figure 29:
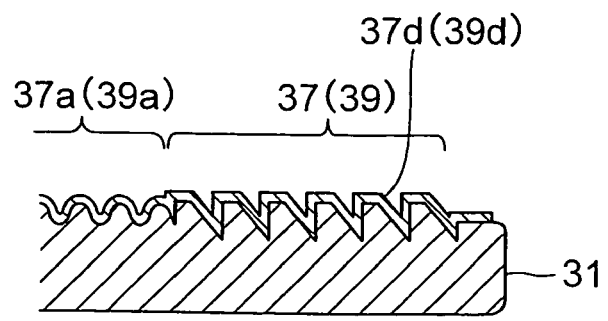
FIG. 29 is an enlarged sectional view of a substantial part of a disk cartridge according to still another embodiment of the present invention.
Figure 30:
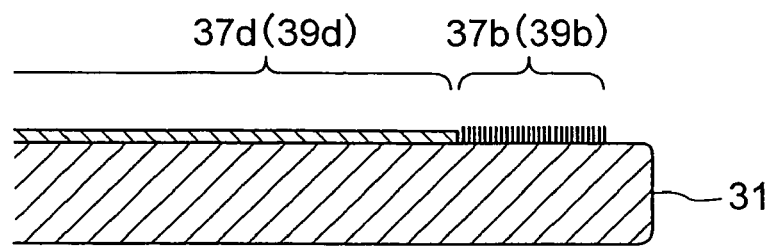
FIG. 30 is an enlarged sectional view of a substantial part of a disk cartridge according to still another embodiment of the present invention.
Figure 31:
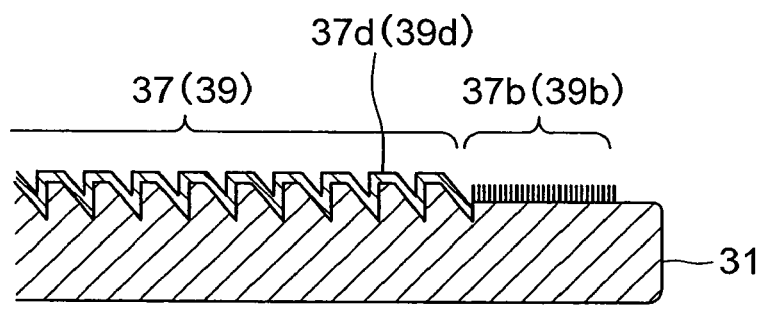
FIG. 31 is an enlarged sectional view of a substantial part of a disk cartridge according to still another embodiment of the present invention.
Figure 32:
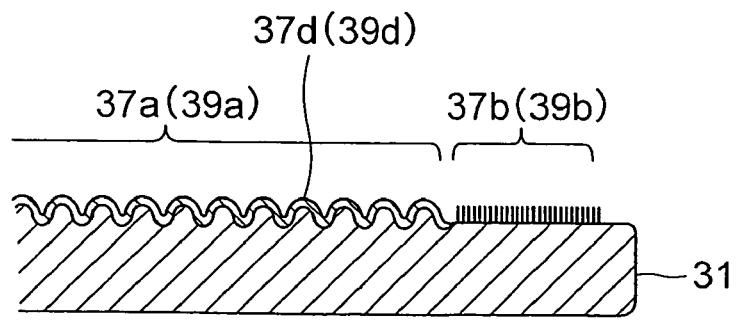
FIG. 32 is an enlarged sectional view of a substantial part of a disk cartridge according to still another embodiment of the present invention.
Figure 33:
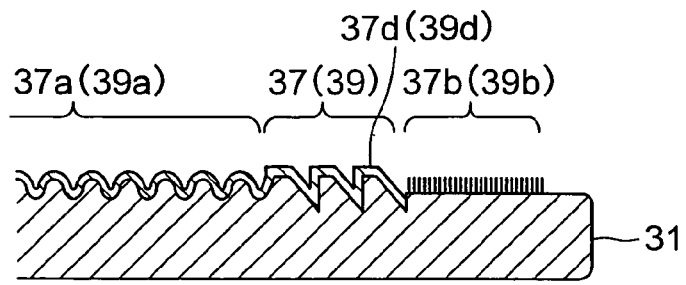
FIG. 33 is an enlarged sectional view of a substantial part of a disk cartridge according to still another embodiment of the present invention.

(5) Instead of the construction in which the light incidence preventing parts each consisting of a set of projections or implanted hair, anti-reflection sheets 37*c* and 39*c* such as unwoven cloth or a polytetrafluoroethylene sheet can be applied to desired positions of the upper half 32 and the lower half 34 of the outer case 2 as shown in FIG. 25, and painting 37*d* and 39*d* of dark color such as black can be applied to desired positions of the upper half 32 and the lower half 34 of the outer case 2 as shown in FIGS. 26 to 33. In these cases, the external light L which incident by passing between the shutter 5 and the shutter sliding surfaces 36 and 38 is absorbed by the antireflection sheets 37*c* and 39*c* or the painting 37*d* and 39*d* of dark color, and therefore, multiple reflections of the external light L is prevented, whereby the external light L which passes between the shutter 5 and the shutter sliding surfaces 36 and 38 so as to come into the inner case 2 can be blocked.

Figure 34:
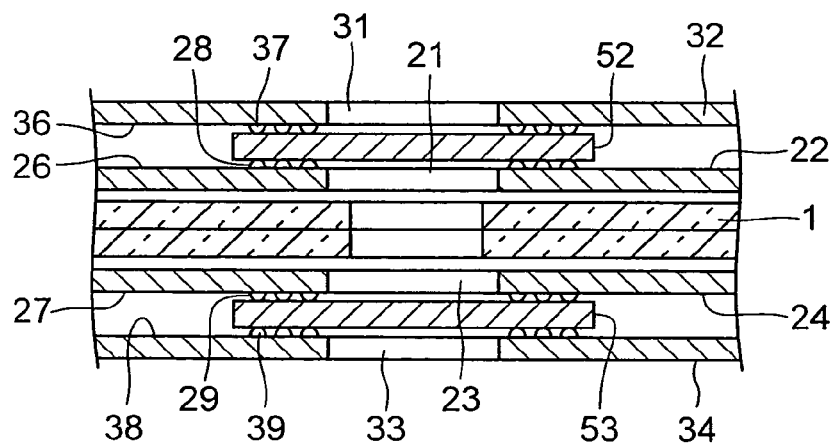
FIG. 34 is an enlarged sectional view of a substantial part of a disk cartridge according to still another embodiment of the present invention.
Figure 35:
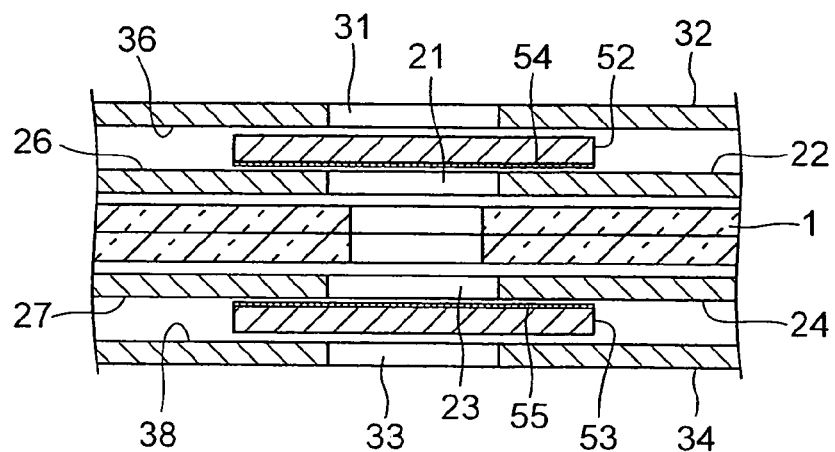
FIG. 35 is an enlarged sectional view of a substantial part of a disk cartridge according to still another embodiment of the present invention.

(6) In each of the above described embodiments, the light incidence preventing parts are formed only on the shutter sliding surfaces 36 and 38 of the outer case 3. However, as shown in FIG. 34, light incidence preventing parts 28 and 29 similar to the light incidence preventing parts 37 to 37*d* and 39 to 39*d* which are formed on the shutter sliding surfaces 36 and 38 of the outer case 3 can be formed on the shutter sliding surfaces 26 and 27 of the inner case 2, and as shown in FIG. 35, light incidence preventing parts 54 and 55 similar to the light incidence preventing parts 37 to 37d and 39 to 39d which are formed on the shutter sliding surfaces 36 and 38 of the outer case 3 can be formed at the head insertion aperture opening and closing part 52 and the spindle insertion aperture opening and closing part 53 of the shutter 5. If the light incidence preventing parts 28, 29, 37 and 39 are formed in both of the inner case 2 and the outer case 3 as shown in FIG. 34, incidence of the external light L into the inner case 2 can be blocked more reliably.

The above described description is made concerning the embodiments, but the present invention is not limited to these, and it is obvious to those skilled in the art to be able to make various changes and corrections within the spirit of the present invention and the scope of the attached claims.

The invention claimed is:

1. A disk cartridge having a double structure for rotatably accommodating a disk-shaped recording medium having upper and lower surfaces, comprising:
   an inner case covering both of the upper and lower surfaces of said disk-shaped recording medium for accommodating said disk-shaped recording medium therein, said inner case having an inner head insertion aperture and an inner spindle insertion aperture;
   an outer case located outside said inner case, said outer case having an outer head insertion aperture provided in a position where said outer head insertion aperture overlaps with said inner head insertion aperture, and an outer spindle insertion aperture provided in a position where said outer spindle insertion aperture overlaps with said inner spindle insertion aperture; and
   a shutter disposed between said inner case and said outer case, for opening and closing said inner head insertion aperture and said outer head insertion aperture, and said inner spindle insertion aperture and said outer spindle insertion aperture.

2. The disk cartridge according to claim 1, wherein each of said inner case and said outer case comprises an upper half and a lower half, and wherein joint surfaces between the upper half and the lower half of said inner case, and joint surfaces between the upper half and the lower half of said outer case are positioned in different planes from each other.

3. The disk cartridge according to claim 1, wherein said shutter comprises a head insertion aperture opening and closing part, a spindle insertion aperture opening and closing part, and a fix connection part for connecting said head insertion aperture opening and closing part and said spindle insertion aperture opening and closing part.

4. The disk cartridge according to claim 3, further comprising a slider mounted to said fix connection part of said shutter for sliding said shutter between said inner case and said outer case.

5. The disk cartridge according to claim 4, wherein said slider comprises a projected portion, and said shutter comprises a hole portion, so that said slider and said shutter are attached to each other by engaging said projected portion and said hole portion with each other.

6. The disk cartridge according to claim 3, wherein said fix connection part of said shutter is positioned on the inside of an end portion of said outer case due to a bridge of said outer case, the bridge being located at end portions of said outer head insertion aperture and said outer spindle insertion aperture.

7. The disk cartridge according to claim 1, further comprising:
   a shutter lock member for locking and releasing the opening and closing operation of said shutter, a center of rotation of the shutter lock member being disposed on the inside of said inner case; and
   a restraining portion provided in said outer case, for restraining said shutter lock member.

8. The disk cartridge according to claim 1, wherein a protruding portion is provided on the inside of said outer case, and a recessed portion is provided in a spot of said inner case, wherein said spot corresponds to the protruding portion.

9. The disk cartridge according to claim 1, wherein said disk-shaped recording medium is a hologram media disk.

10. The disk cartridge according to claim 1, wherein a light incidence preventing part for preventing external light from leaking into said inner case from a portion between said shutter and said shutter sliding surface is provided on a shutter sliding surface outside said inner case and/or a shutter sliding surface inside said outer case.

11. The disk cartridge according to claim 10, wherein said light incidence preventing part is provided only in a peripheral portion of each of said insertion apertures on said shutter sliding surface.

12. The disk cartridge according to claim 10, wherein said light incidence preventing part is a rib-shaped projection or a crimp-shaped projection formed on said shutter sliding surface.

13. The disk cartridge according to claim 10, wherein said light incidence preventing part is a combination of a rib-shaped projection and a crimp-shaped projection formed on said shutter sliding surface.

14. The disk cartridge according to claim 10, wherein said light incidence preventing part is a hair implant applied onto said shutter sliding surface.

15. The disk cartridge according to claim 10, wherein said light incidence preventing part is a combination of a rib-shaped projection or a crimp-shaped projection and a hair implant, which are provided on said shutter sliding surface.

16. The disk cartridge according to claim 10, wherein said light incidence preventing part is an antireflection sheet which is stuck on said shutter sliding surface.

17. The disk cartridge according to claim 10, wherein said light incidence preventing part is painted a dark color such as black which is applied to said shutter sliding surface.

18. The disk cartridge according to claim 10, wherein said light incidence preventing part is painted a dark color such as black which is applied onto a surface of said shutter opposed to said inner case and/or said outer case.

19. The disk cartridge according to claim 1, wherein a part of said inner case is a curved surface part along an outer peripheral shape of said disk-shaped recording medium, and a part of said outer case corresponding to the curved surface part is formed as a thin walled part.

20. The disk cartridge according to claim 1, wherein said outer case comprises an upper half and a lower half, one of which upper half and lower half comprises a groove for sliding an arm of an information recording and reproducing apparatus for opening and closing the shutter, and the other of which upper half and lower half comprises a recessed part for receiving an incorrect insertion preventing arm of the information recording and reproducing apparatus on a side opposed to said groove.

21. An information recording and reproducing apparatus for recording and reproducing the disk cartridge according to claim 20, comprising two sets of arms for opening and closing the shutter, and an arm for preventing incorrect insertion.

* * * * *